J. F. KERRIGAN.
AUTOMOBILE BED.
APPLICATION FILED AUG. 18, 1916.

1,306,258.

Patented June 10, 1919.
2 SHEETS—SHEET 1.

Inventor
John F. Kerrigan.
By

J. F. KERRIGAN.
AUTOMOBILE BED.
APPLICATION FILED AUG. 18, 1916.
1,306,258.
Patented June 10, 1919.
2 SHEETS—SHEET 2.
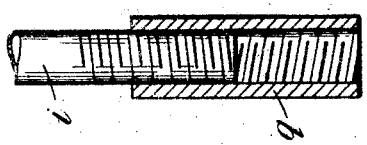
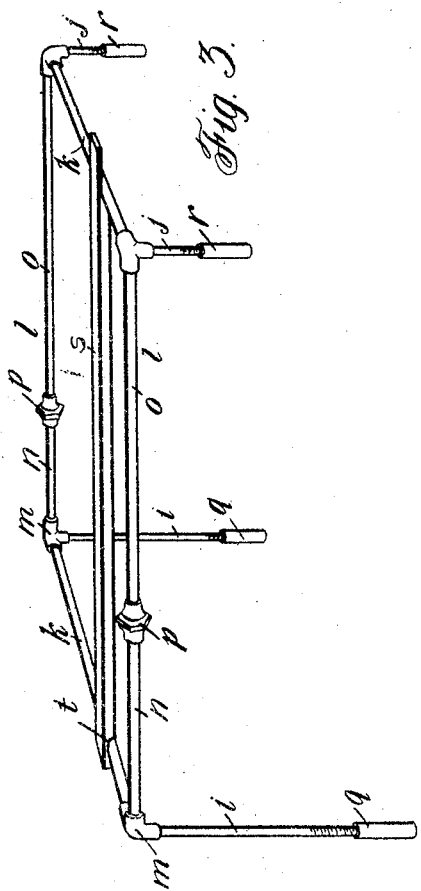
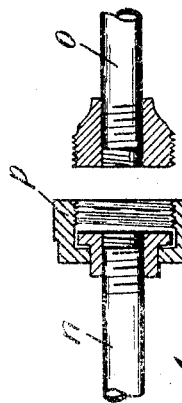
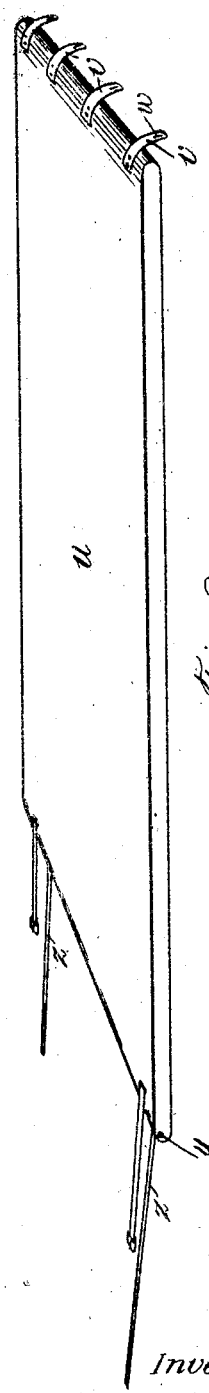
Inventor
John F. Kerrigan
By
Atty

UNITED STATES PATENT OFFICE.

JOHN F. KERRIGAN, OF PORTLAND, OREGON.

AUTOMOBILE-BED.

1,306,258.  Specification of Letters Patent.  Patented June 10, 1919.

Application filed August 18, 1916. Serial No. 115,715.

*To all whom it may concern:*

Be it known that I, JOHN F. KERRIGAN, a citizen of the United States, and a resident of the city of Portland, county of Multnomah, State of Oregon, have invented a new and useful Improvement in Automobile-Beds, of which the following is a specification.

This invention relates generally to automobile beds, and has particularly to do with that type of same in which the seat cushions are utilized as a mattress.

One of the main objects of this invention is to provide an improved bed of this character, adapted to be set up in the body of an automobile, so as to provide a large, comfortable bed area.

Further objects of my invention are to provide means for mounting this bed, which means will be independent of any make of automobile, will not require mutilation of the latter in any way, which will be rigid and strong, adjustable to permit adaptation to any automobile, and which will occupy but small space when not in use.

Still further objects of my invention are to provide a device of this character which can be set up or taken down in a very short space of time and with but little labor, and which will not mar or injure the upholstery or other parts of the automobile in any way whatever.

The features which emphasize my invention are fully shown in the accompanying drawings, in which—

Fig. 2, is a perspective view of the member which forms the top of the bed;

Fig. 3, is a perspective view of the adjustable and demountable frame which is mounted in the tonneau of the automobile, and adapted to form the support of the bed proper;

Fig. 4, is a sectional detail of one of the connecting elements of the bed frame shown in Fig. 3; and Fig. 5, is a sectional detail showing an adjustable foot of one of the frame legs.

Figure 1:
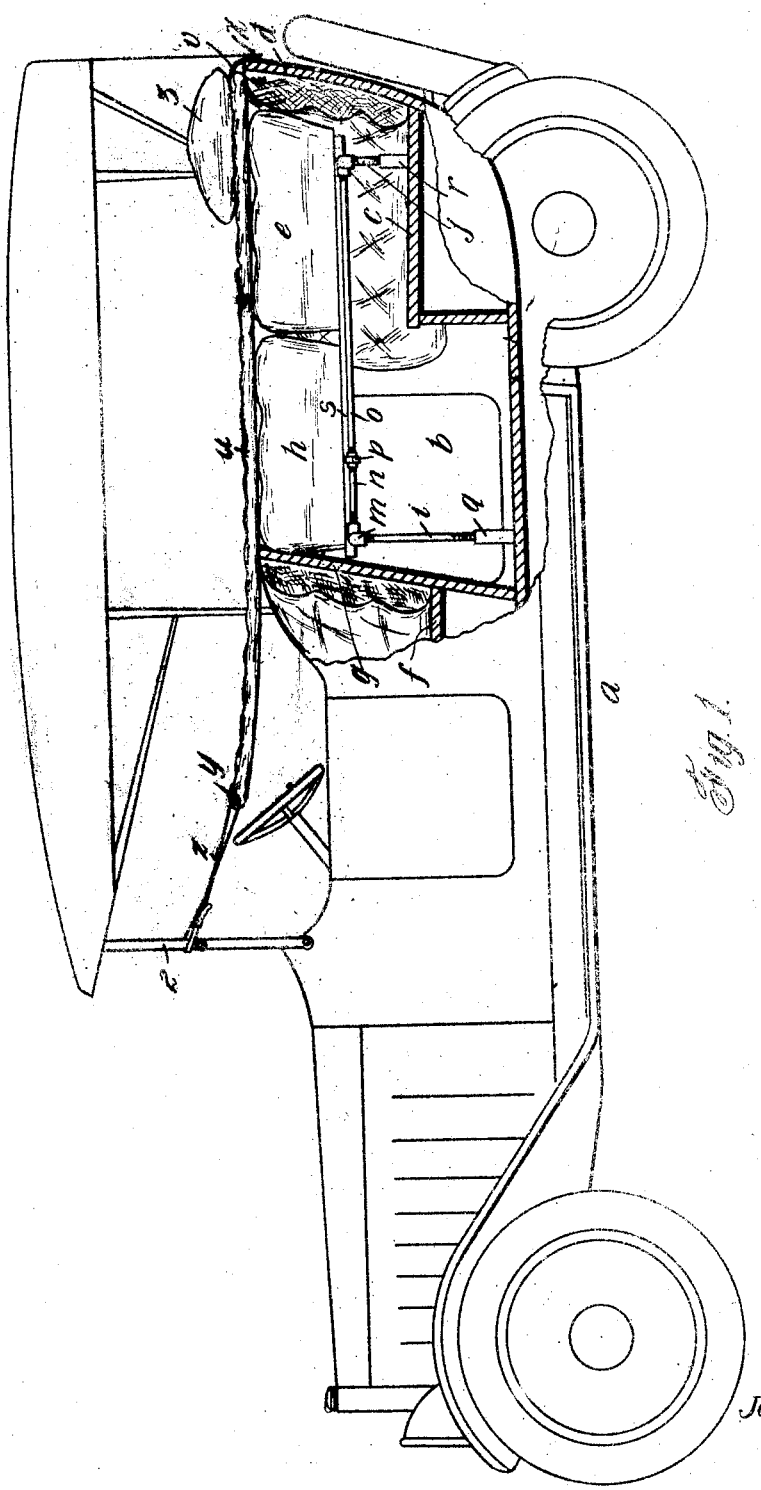
Figure 1, is a side elevation, partly in section, of an automobile, showing the device of my invention as used in connection therewith.

$a$ represents diagrammatically an automobile of the touring car type, and which may be of any make. Of this automobile, $b$ represents the tonneau, $c$ is the rear seat, $d$ the back of the rear seat, and $e$ is the rear seat cushion. $f$ represents the front seat, $g$ is the back of the front seat, and $h$ is the front seat cushion.

The frame shown in Fig. 3, is adapted to be mounted in the tonneau of the automobile, so that when the seat cushions $e$ and $h$, are placed on the top of said frame, the upper plane of these cushions will form an even surface with the tops of the backs $g$ and $d$ of the front and rear seats respectively. This frame performs the function of a bed-stead, and consists essentially of the following parts; $i$ are the front legs, $j$ are the rear legs, $k$ are the transverse frame members, and $l$ are longitudinal frame members. The corners of the frame comprise the right angled three way fittings $m$. The longitudinal frame members $l$ are made in sections $n$ and $o$, which are connected by the unions $p$. The elements of this frame are demountably attached to each other so that they may be taken apart and stored in a small space when not in use. The feet of the legs $i$ and $j$ are adjustable, and as shown, comprise sleeves $q$ and $r$ respectively, threaded on said legs. Adjustment of these sleeves will shorten or lengthen the legs as desired, so as to permit the top surface of the seat cushions to be placed in the proper plane. In setting up the frame the rear legs will usually be mounted on the rear seat, and the front legs on the floor.

A plurality of longitudinal slats $s$ are grooved at the front end as indicated by $t$, so as to engage the front transverse frame member $k$. These slats provide auxiliary braces for supporting the seat cushions $e$ and $h$.

A mattress $u$, is adapted to be stretched tightly over the top of the seat cushions, as shown in Fig. 1. The rear end of this mattress is provided with a plurality of straps $v$, provided with button holes $w$, which are adapted to button over the rear curtain buttons $x$. The front end of the mattress projects over the front seat, being unsupported from beneath, and inserted through the mattress, along the front edge thereof is a rigid rod $y$ which forms the stiffening element to hold said mattress from sagging. A pair of straps $z$ engage this rod $y$ and are fastened around the wind-shield standards, 2. By tightening these straps to the proper tension the mattress $u$ will be stretched tightly and its forward end firmly supported in the position shown in Fig. 1.

For the purpose of convenience a pillow 3 may be used, although this element is not a necessary adjunct of the invention. Furthermore the bedclothes which would ordinarily be used with the bed are omitted from the drawings.

While I have shown the supporting frame, as illustrated in Fig. 3, to be composed entirely of standard pipe fittings, nevertheless this is only one desirable form of construction, and I do not wish to limit myself to such construction. The frame may be made of wood or of flat metal and still be very satisfactory. Furthermore, the mattress $u$ does not necessarily have to be padded, and when space is limited, a canvas cover or its equivalent may be substituted for said mattress.

In view of the fact that the dimensions and forms of different makes of automobiles vary, the adjustable features of the frame are very important, as they adapt the device to be used in any automobile.

An additional feature of the frame is the fact that it may be used as a table as well as a bed-stead.

I claim

A collapsible bed for passenger auto vehicles comprising the combination of a frame the sides consisting of sections, connections for said sides and ends, such connections including perpendicular sockets, legs fastened in said sockets, the legs at one end of the frame being normally longer than those at the other end and being adjustable as to length, and a plurality of slats provided at one end with means for engaging the transverse member of one end of the frame.

JOHN F. KERRIGAN.